(12) United States Patent
Hendricks (10) Patent No.: US 9,225,537 B1
(45) Date of Patent: Dec. 29, 2015

(54) COMMUNICATION MODE VIA MOBILE COMMUNICATIONS DEVICE

(75) Inventor: Patrick Hendricks, Douglas, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1155 days.

(21) Appl. No.: 11/250,349

(22) Filed: Oct. 14, 2005

(51) Int. Cl.
*G06F 15/16* (2006.01)
*H04L 12/18* (2006.01)
*H04L 29/08* (2006.01)

(52) U.S. Cl.
CPC ...... *H04L 12/1813* (2013.01); *H04L 29/08684* (2013.01)

(58) Field of Classification Search
CPC ............ H04L 29/08684; H04L 12/1813; H04L 12/581; H04L 12/589
USPC ................................................ 709/204, 205
See application file for complete search history.

(56) References Cited

U.S. PATENT DOCUMENTS

| | | | |
|---|---|---|---|
| 2004/0268265 A1* | 12/2004 | Berger | 715/752 |
| 2005/0044152 A1* | 2/2005 | Hardy et al. | 709/206 |
| 2005/0165893 A1* | 7/2005 | Feinberg et al. | 709/205 |
| 2005/0165935 A1* | 7/2005 | Moody et al. | 709/228 |
| 2006/0053379 A1* | 3/2006 | Henderson et al. | 715/751 |
| 2006/0135142 A1* | 6/2006 | Repka | 455/418 |
| 2007/0088818 A1* | 4/2007 | Roberts et al. | 709/224 |
| 2008/0165938 A1* | 7/2008 | Yasko | 379/88.17 |

* cited by examiner

*Primary Examiner* — Karen Tang
(74) *Attorney, Agent, or Firm* — Baker & Hostetler LLP (57) ABSTRACT

Information is provided via a table displayed on a mobile communication device listing contacts in one column and icons representing various communication modes in other columns. Contact list members' associations with communication modes are indicated by attributes assigned to icons rendered via the display of the mobile communications device. Example communication modes include instant messaging, push to talk, voice communications, and email. Icon attributes can indicate a member's subscription status to a particular communication mode, a member's availability (online/offline) for a particular communication mode, and a member's preferred communication mode. The user can scroll through the table to view communication mode information about members on the contact list. The user can initiate communications via a selected communication mode by selecting an icon, or selecting a row and column of the table, being rendered on the display of the mobile communications device.

12 Claims, 12 Drawing Sheets

COMMUNICATION MODE VIA MOBILE COMMUNICATIONS DEVICE

TECHNICAL FIELD

The technical field generally relates to mobile electronic communications devices and more specifically relates to providing communication mode information via a mobile electronic communications device.

BACKGROUND

If a typical user of a mobile device, such as a portable phone for example, wants to communicate with another party, the user first launches an application, then searches for an intended recipient, further determines if the intended recipient is available/capable of receiving a message, and finally sends the message, or decides not to send the message. For example, if the user wants to send an instant message, the user first launches instant messaging. Then the user searches through a contact list to find the intended recipient of the instant message. Once the intended recipient is found, the user can determine if the intended recipient can receive the instant message. For example, the intended recipient may subscribe to instant messaging, but be configured not to receive messages (e.g., listed as offline). Finally, the user sends the instant message (if the intended recipient is accepting messages).

If the intended recipient was not found by searching the contact list, of was listed of offline, the user can decide to communicate with the intended recipient via another communication mode, such as email for example. However, at this point, the user has no idea whether the intended recipient participates in email or is accepting email messages. Thus, the user must first launch email and again search through a list of contacts for the intended recipient. If the intended recipient is found and is available to receive email, the user can send an email message to the intended recipient. As the above examples illustrate, communicating with various parties via various communication modes can be time consuming, cumbersome, and tedious.

SUMMARY

A mobile communications device provides names of members of a contact list and an indication of each member's association with various communication modes. In an exemplary embodiment, information is provided via a table listing contacts in one column and icons representing various communication modes in other columns. In any particular row in the table, a member's associations with various communication modes are indicated by attributes of the icons in that row. The communication modes can include instant messaging, push to talk, voice communications, and email, for example. Icon attributes can indicate, for example, a member's subscription status to a particular communication mode, a member's availability (online/offline) for a particular communication mode, and a member's preferred communication mode, or modes. The user can scroll through the table to view communication mode information about other members on the contact list. The user also is provided a means to initiate communications via a selected communication mode by selecting an icon, or selecting a row and column of the table, being rendered on the display of the mobile communications device.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

Figure 1:
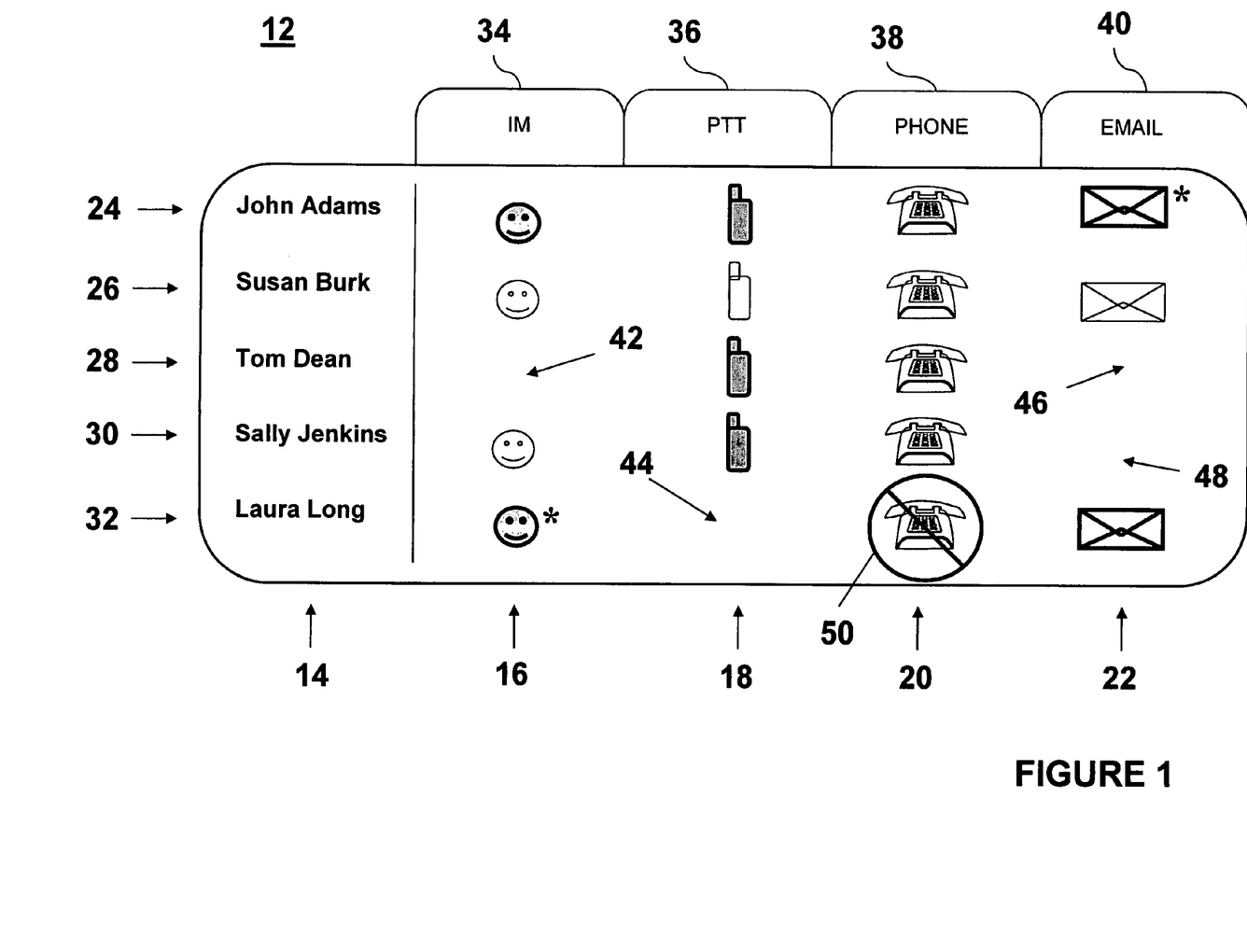
FIG. 1 is a diagram of an exemplary display comprising a table for rendering communication mode information.

FIG. 1 is a diagram of an exemplary display comprising a table 12 for rendering communication mode information. The table 12 comprises columns 14, 16, 18, 20, and 22, and rows 24, 26, 28, 30, and 32. Four communication modes are depicted in the table 12. Instant Messaging (IM) is depicted by tab labeled 34, Push To Talk (PTT) is depicted by the tab labeled 36, voice communications (Phone) is depicted by the tab labeled 38, and Email is depicted by the tab labeled 40. A different respective icon is shown to represent each communication mode in the table 12. A happy face icon represents IM, as depicted in column 16 of the table 12. A side view of a cellular telephone icon represents PTT, as depicted in column 18 of the table 12. A desk phone icon represents the Phone communication mode, as depicted in column 20 of the table 12. And an envelope icon represents Email, as depicted in column 22 of the table 12. The icons depicted in the table 12 are exemplary. Any appropriate icons, or other representations, can be used.

Column 14 of the table 12 comprises a contact list. Each row in column 14 depicts a member of the contact list. Each icon in a row is indicative of an association between the member in that row and the respective communication mode in the icon's column. Each icon is given attributes to indicate specific associations. For example, an icon can be presented in bold font to indicate that a member of the contact list subscribes to a service providing a respective communication mode (or more generally is capable of communicating via the respective communication mode). An icon can be presented in non-bold font to indicate that a member does not subscribe to a service providing a respective communication mode (or more generally is not capable of communicating via the respective communication mode). Alternatively, if a member does not subscribe to a service providing a respective communication mode, an icon is not presented (non-display) at the appropriate row and column of the table 12.

As can be appreciated, various icon attributes can be used. For example, icons can be color coded, icons can be highlighted or not highlighted, icons can be in bold font or non-bold font, icons can be overlaid over icons, or a combination thereof. The associations that can be represented by icon attributes include a member's subscription status to a service providing a respective communication mode (or more generally is capable of communicating via a respective communication mode), a member's availability (online/offline) to communicate via a respective communication mode, and a member's preference of one or more communication modes over other communication modes. For example, no icons are depicted at the locations of the table 12 labeled 42, 44, 46, and 48. The non-display of icons at these locations is an indication that the respective members are not capable of communicating via the respective communication mode. A member could not be capable of communicating via a particular communication mode for any of various appropriate reasons, such as the member does not subscribe to a service providing the particular communication mode, the communication mode is not available in a geographic area, the communication mode is out of service, or a combination thereof, for example. Thus, as indicated at row 28, column 34 (labeled 42), Tom Dean is not capable of communicating via IM because no icon is displayed at that location in the table 12. This could be, for example, because Tom Dean does not subscribe to a service that provides the IM communication mode. Tom Dean also is not capable of communicating via Email, as indicated by the non-display of an icon at row 28, column 40 (labeled 46). As depicted by the non-display of an icon at the location 48 (row 30/column 22), Sally Jenkins is not capable of communicating via Email, and as depicted at the location 44 (row 32/column 18), Laura Long is not capable of communicating via PTT.

Another means for indicating that a member is not capable of communicating via a respective communication mode is shown at row 32, column 20 of the table 12. The desktop telephone icon is overlaid with the universal "no" icon, or symbol 50 (⊘). Thus, Laura Long is not capable of communications via voice communications as indicated by the overlaid icons at row 32, column 20 of the table 12. Laura Long also is not capable of communicating via PTT as indicated by the non-display of the cell phone icon at row 32, column 18 of the table 12.

As depicted in the table 12, an icon in a particular location indicates that a respective member is capable of communicating via a respective communication mode, the non-display of an icon indicates that the member is not capable of communicating via the communication mode. An icon overlaid with the universal "no" icon also indicates that a respective member is not capable of communicating via a respective communication mode. An icon in bold font indicates that a respective member is available via a respective communication mode, and an icon in non-bold font indicates that the member is not available via the communication mode. An asterisk proximate an icon indicates that the respective communication mode is a preferred communication mode.

From table 12, it can be seen that John Adams is capable of communication via IM, PTT, Phone, and Email, as indicated by the icons at row 24/column 16, row 24/column 18, row 24/column 20, and row 24/column 22, respectively. Further, John Adams is available to communicate via IM, PTT, Phone, and Email as indicated by the icons in row 24 being in bold font. If John Adams, or any member of the contact list, has a preferred communication mode, the icon representing that mode can be given an attribute such as modulating (e.g. flashing on and off) an attribute of the icon, color coding the icon, or a combination thereof. Any appropriate attribute can be used to indicate a preferred communication mode. For example, another icon and/or text can be rendered on the table to indicate preference. In an exemplary embodiment, as depicted by the asterisk next to the envelope icon at row 24, column 22, John Adams prefers email as a communication mode. Further, multiple preferred communication mode can be indicated.

Susan Burk is capable of communication via IM, PTT, Phone, and Email, as indicated by the icons at row 26/column 16, row 26/column 18, row 26/column 20, and row 26/column 22, respectively. However, Susan Burk is not available to communicate via any communication mode (IM, PTT, Phone, or Email) as indicated by the icons in row 26 being in non-bold font. Tom Dean is capable of communicating via PTT and Phone as indicated by the icons at row 28/column 18 and row 28/column 20, respectively. Tom Dean is not capable of communicating via IM and Email as indicated by the non-display of icons at row 28/column 16 and row 28/column 22, respectively. Tom Dean is available to communicate via PTT and Phone as indicated by the icons in row 28/column 18 and row 28/column 20, respectively, being in bold font.

Sally Jenkins is capable of communication via IM, PTT, and Phone, as indicated by the icons at row 30/column 16, row 30/column 18, and row 30/column 20, respectively. Sally Jenkins is not capable of communication via Email as indicated by the non-display of an icon at row 30/column 22. Sally Jenkins is available to communicate via PTT and Phone as indicated by the icons at row 30/column 18 and row 30/column 20, respectively, being in bold font. Sally Jenkins is not available to communicate via IM as indicated by the icon at row 30/column 16 being in non-bold font. Laura Long is capable of communication via IM and Email, as indicated by the icons at row 32/column 16 and row 32/column 22, respectively. Laura Long is not capable of communicating via PTT as indicated by the non-display of an icon at row 32/column 18. Laura Long is not capable of communicating via Phone as indicated by the overlaid icons at row 32/column 20. Laura Long is available to communicate via IM and Email as indicated by the icons in row 32/column 16 and row 32/column 22, respectively, being in bold font. Further, Laura Long's preferred mode of communications is IM as indicated by the asterisk next to the happy face icon at row 32/column 16.

It is emphasized that the table 12 is exemplary. For example, the number of rows, the number of columns, specific icons used, attributes of each icon, specific colors used, communication modes, and member associations with each communication mode can be varied from those depicted in the table 12. Further, other cues can be used such as audio cues and mechanical cues (e.g., vibration), for example.

Communications can be initiated in any of several ways. In an exemplary embodiment, communication with a desired member of the contact list via a desired communication mode is initiated by selecting the icon in the desired row and column. For example, if a user wants to initiate communications via Email with John Adams, the user can select the icon located at row 24/column 22. Communications also can be initiated by selecting a row and column of the table 12. For example, email communications with John Adams could be initiated by selecting the Email tab 40 and the name "John Adams" at row 24, column 14 of the table 12.

Figure 2:
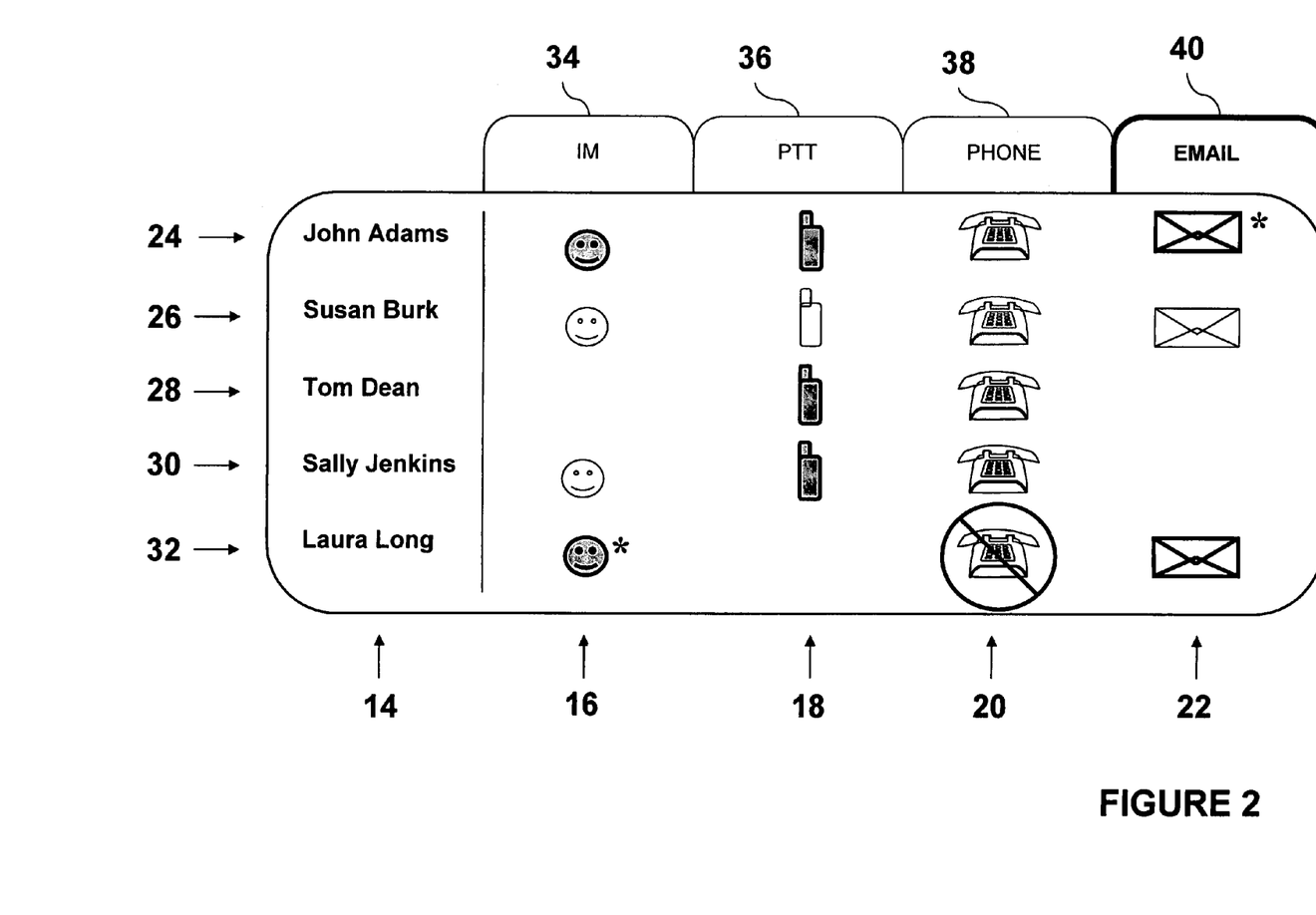
FIG. 2 is a diagram of an exemplary display illustrating selection of a column.

FIG. 2 is a diagram of an exemplary display illustrating selection of a column. A column can be selected by any appropriate means. For example, a column can be selected by selecting the tab at the top of the column (e.g., tab 40 to select column 22), or an icon in the column can be selected. As depicted in FIG. 2, the Email 40 is highlighted to indicate that the Email communication mode was selected. Any appropriate selection mechanism can be used, for example a mouse, a highlighted bar, a thumbwheel, a keyboard, or a combination thereof, for example. As shown in FIG. 2, the text of the Email tab 40 is in bold font to indicate that row 22 has been selected. However, it is to be understood that any appropriate means can be used to indicate selection of a column. For example, the tab associated with the communication mode and/or the name on the contact list can be given a bold font, can be color coded, can have attributes modulated, can display another icon (e.g., asterisk) or a combination thereof.

Figure 3:
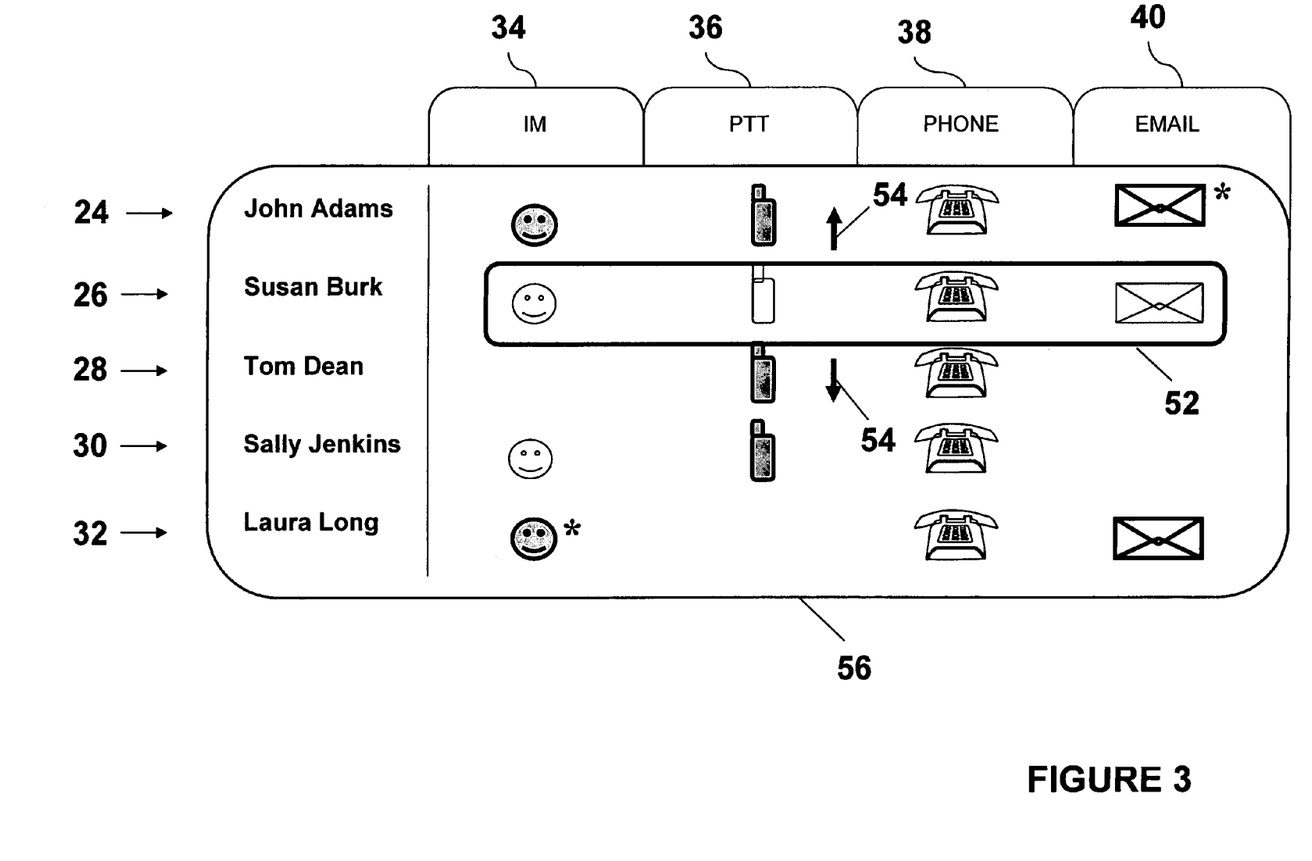
FIG. 3 is an illustration of an exemplary diagram indicating selection of a row.

FIG. 3 is an illustration of an exemplary diagram indicating selection of a row. Selection of a row can be indicated by outlining icons in row with a border. For example, as depicted in FIG. 2, selection of row 26 is indicated by outlining the icons in row 26 with the border 52. In an exemplary embodiment, a row is selected by selecting a name in the contact list. Alternatively, a row can be selected by selecting an icon, resulting in the icons in the row in which the icon is located being outlined. In an exemplary embodiment, the member name of the selected row can be highlighted and/or bolded to indicate a respective row has been selected. It is to be understood however, that any appropriate means can be used to indicate selection of a row.

Once a row or column is selected, the selection can be scrolled to select other rows or columns. Thus, if a column is selected, for example column 22 of the table 12, the user can move the selecting mechanism (selecting mechanism not shown) to the left to select column 20. This process can continue until a desired column is selected. This is advantageous when more communication modes exist than can be rendered on a single display. Scrolling the column selector will allow other communication modes to be rendered and selected. Also, the selection of a row can be scrolled.

Figure 4:
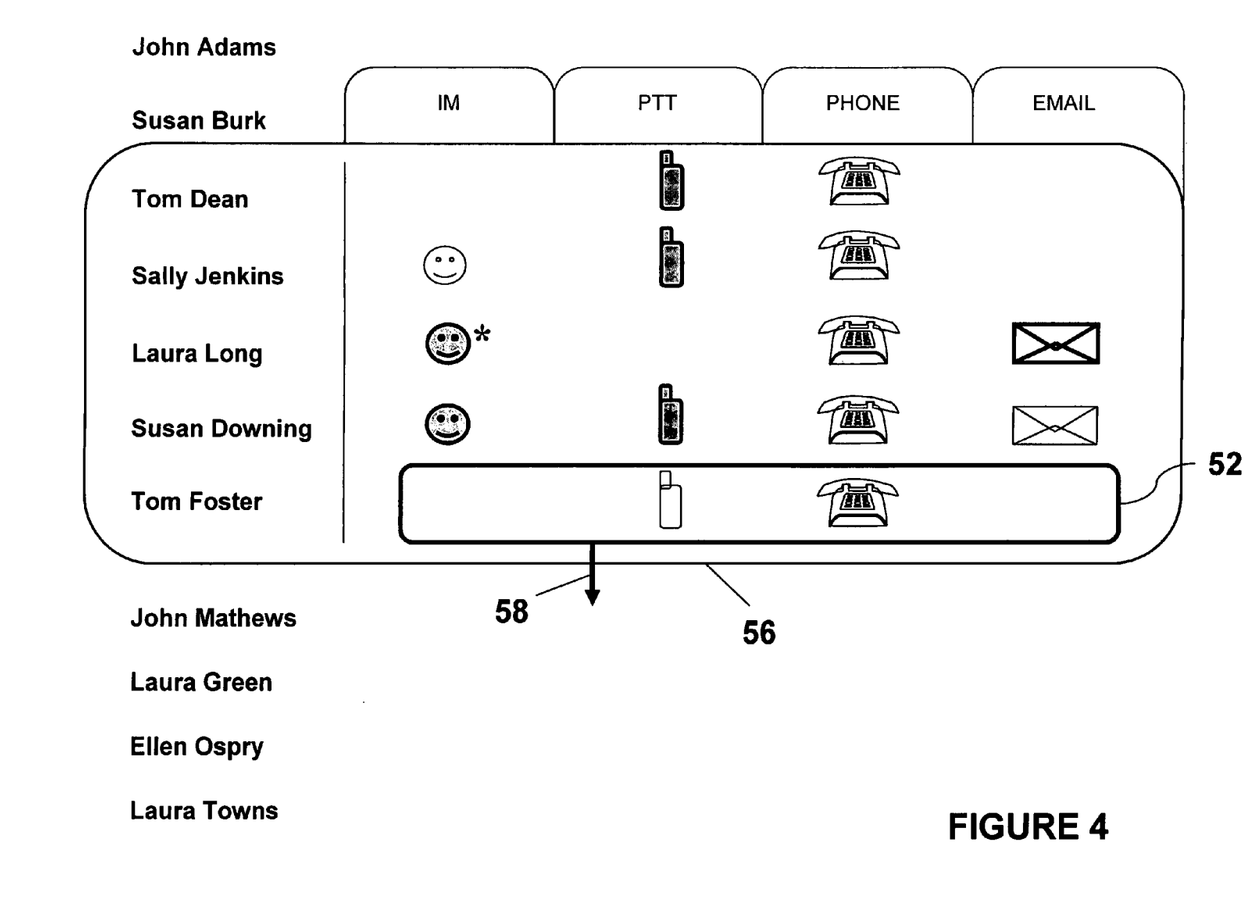
FIG. 4 is an exemplary diagram depicting scrolling a selection of a row.

FIG. 4 is an exemplary diagram depicting scrolling the selection of a row. In an exemplary embodiment, the border 52 can be scrolled up or down as indicated by arrows 54. As the border 52 is scrolled, it remains within display window 56. As the border 52 is scrolled to the edge of the display window 56, additional members of the contact list and additional icons (as appropriate) appear in the display window 56. As shown in FIG. 4, the contact list includes additional members John Mathews, Laura Green, Ellen Ospry, and Laura Towns. Prior to scrolling the row selection indicator (border 52), these additional member names were not rendered in the display window 56. As the border 52 is scrolled downward, as indicated by arrow 58, the additional names enter the display window 56. As shown in FIG. 4, the border 52 has been scrolled downward to select Tom Foster. Because of the fixed size of the display window 56 as members (Susan Downing and Tom Foster) enter into the display window 56, two members (John Adams and Susan Burk) exit the display window 56.

Figure 5:
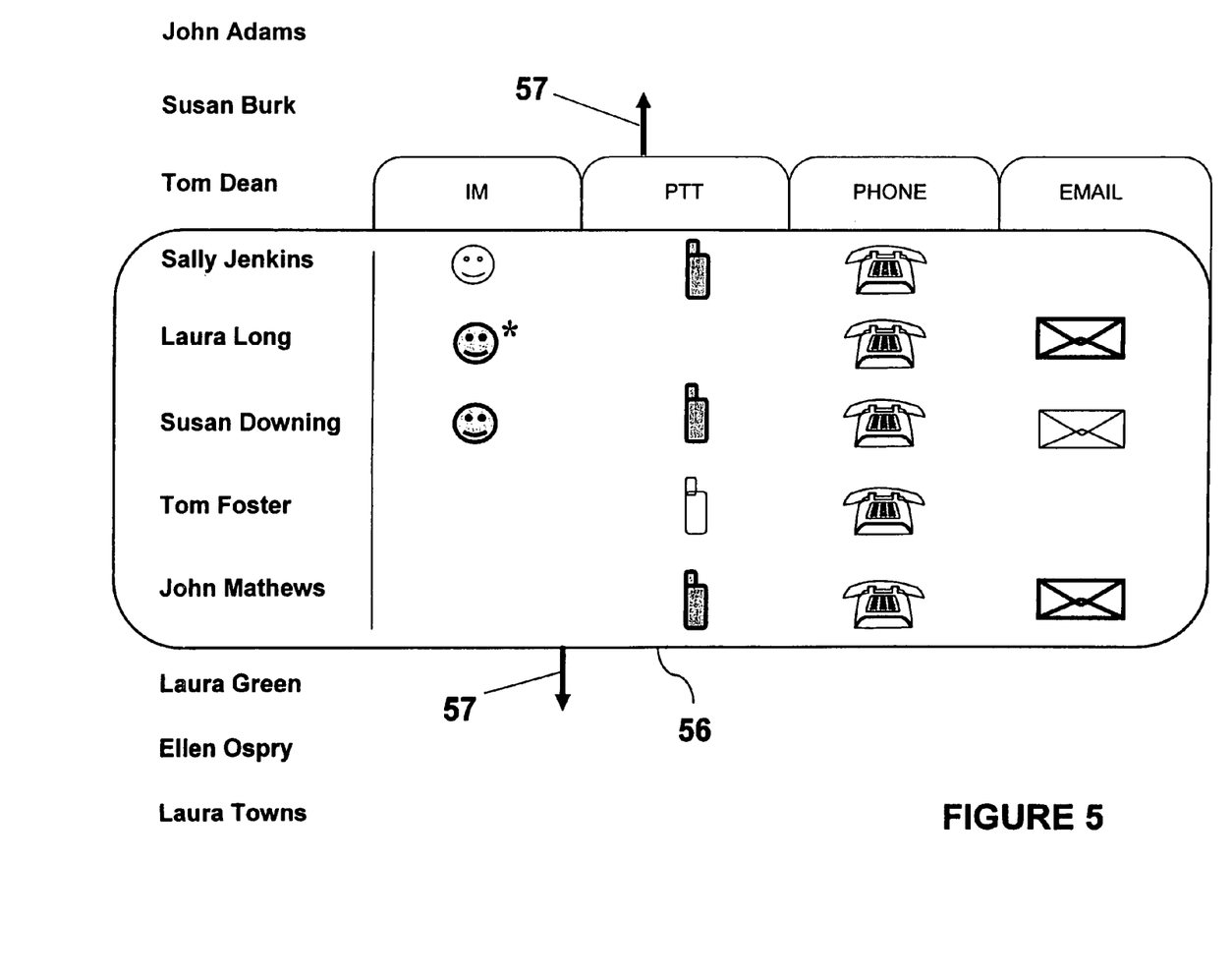
FIG. 5 is an exemplary diagram depicting scrolling a display window.

The display window 56 also can be scrolled with or without a row or column being selected. FIG. 5 is an exemplary diagram depicting scrolling the display window 56 as indicated by the arrows 57. Comparing FIG. 5 with FIG. 4, the display window 56 in FIG. 5 has been scrolled downward to include members Sally Jenkins, Laura Long, Susan Downing, Tom Foster, and John Mathews. As the display window 56 is scrolled, rendered information is updated accordingly. Thus, John Mathews was added to the display window 56 and Tom Dean was removed from the display window 56. Also, the icons and other information in the rows and columns of the table are updated accordingly.

Figure 6:
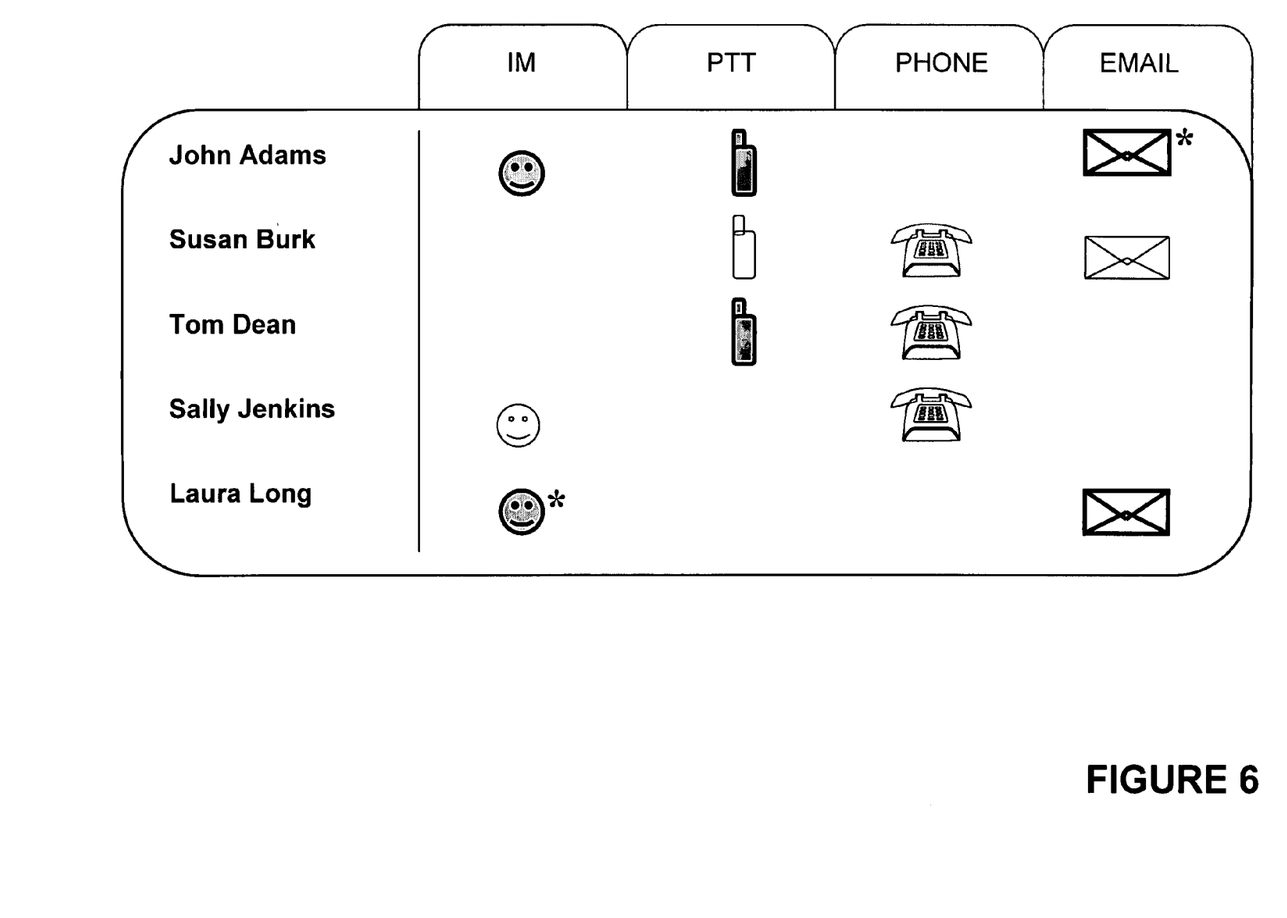
FIG. 6 is an illustration of a table indicating another exemplary association between various members and various communication modes.

In an exemplary embodiment, the information rendered on the display can be driven by the communication mode. In this exemplary embodiment, the user can select a communication mode, and members capable of communicating via that communication mode will have their information rendered on the display. Members not able to communicate via the selected communication mode will have their information not rendered, modified to indicate their status, or a combination. For example, FIG. 6 is an illustration of a table indicating that Susan Burk and Tom Dean have no IM capability, Sally Jenkins and Laura Long have no PTT capability, John Adams and Laura Long have no phone capability, and Tom Dean and Sally Jenkins have not Email capability.

Figure 7:
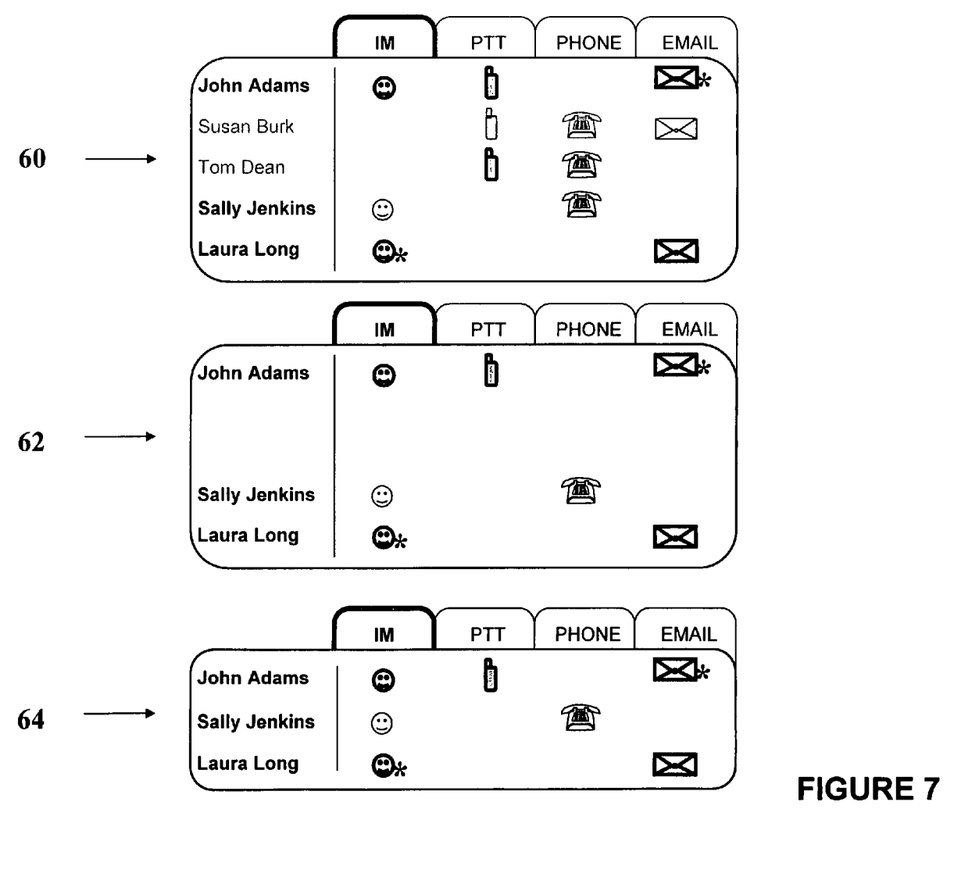
FIG. 7 is an illustration of various exemplary displays for rendering information driven by selection of the IM communication mode.

FIG. 7 is an illustration of various exemplary displays for rendering information driven by selection of the IM communication mode. The IM communication mode is selected as indicated by the IM tab and text being in bold font in displays 60, 62, and 64. In display 60, the names of members that can not communicate via the selected communication mode, i.e., IM, are shown in non-bold font. In another embodiment, the names of members not capable of communicating via IM and their respective icons are not rendered on the display as depicted on display 62. In display 64, the names of members not capable of communication via IM and their respective icons are not rendered on the display and the display window is compressed.

Figure 8:
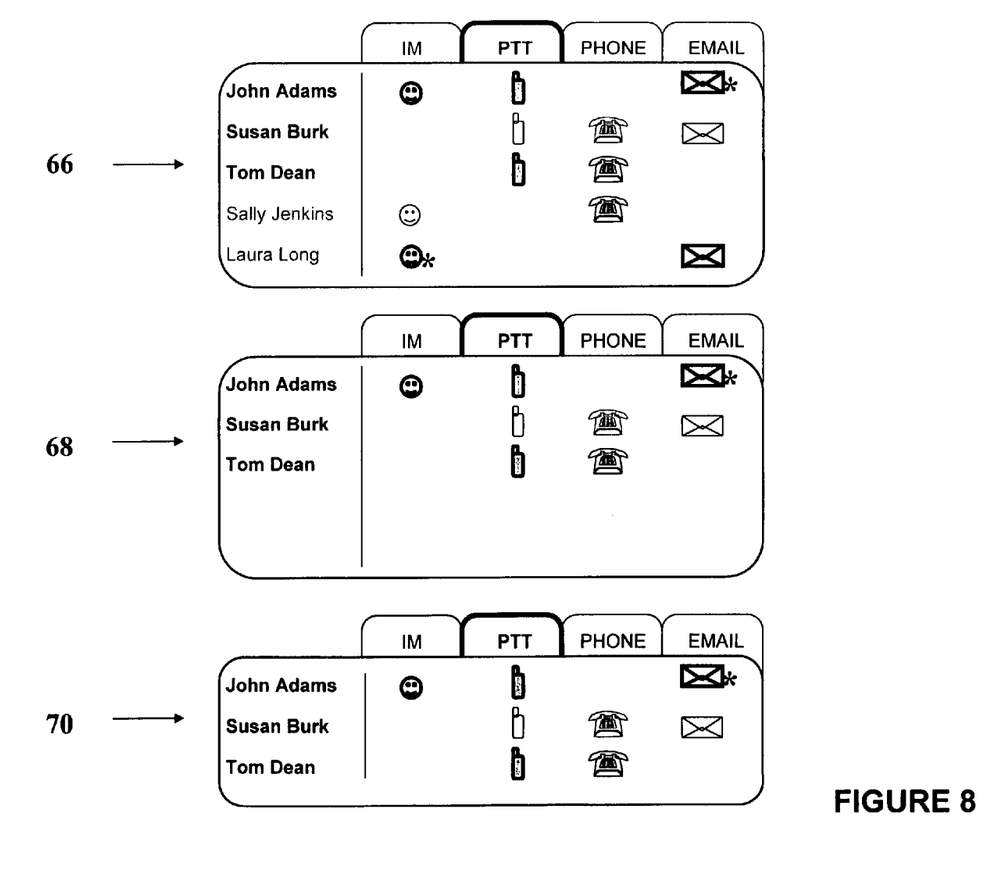
FIG. 8 is an illustration of various exemplary displays for rendering information driven by selection of the PTT communication mode.

FIG. 8 is an illustration of various exemplary displays for rendering information driven by selection of the PTT communication mode. The PTT communication mode is selected as indicated by the PTT tab and text being in bold font in displays 66, 68, and 70. In display 66, the names of members that can not communicate via the selected communication mode, i.e., PTT, are shown in non-bold font. In another embodiment, the names of members not capable of communicating via PTT and their respective icons are not rendered on the display as depicted on display 68. In display 70, the names of members not capable of communication via PTT and their respective icons are not rendered on the display and the display window is compressed.

Figure 9:
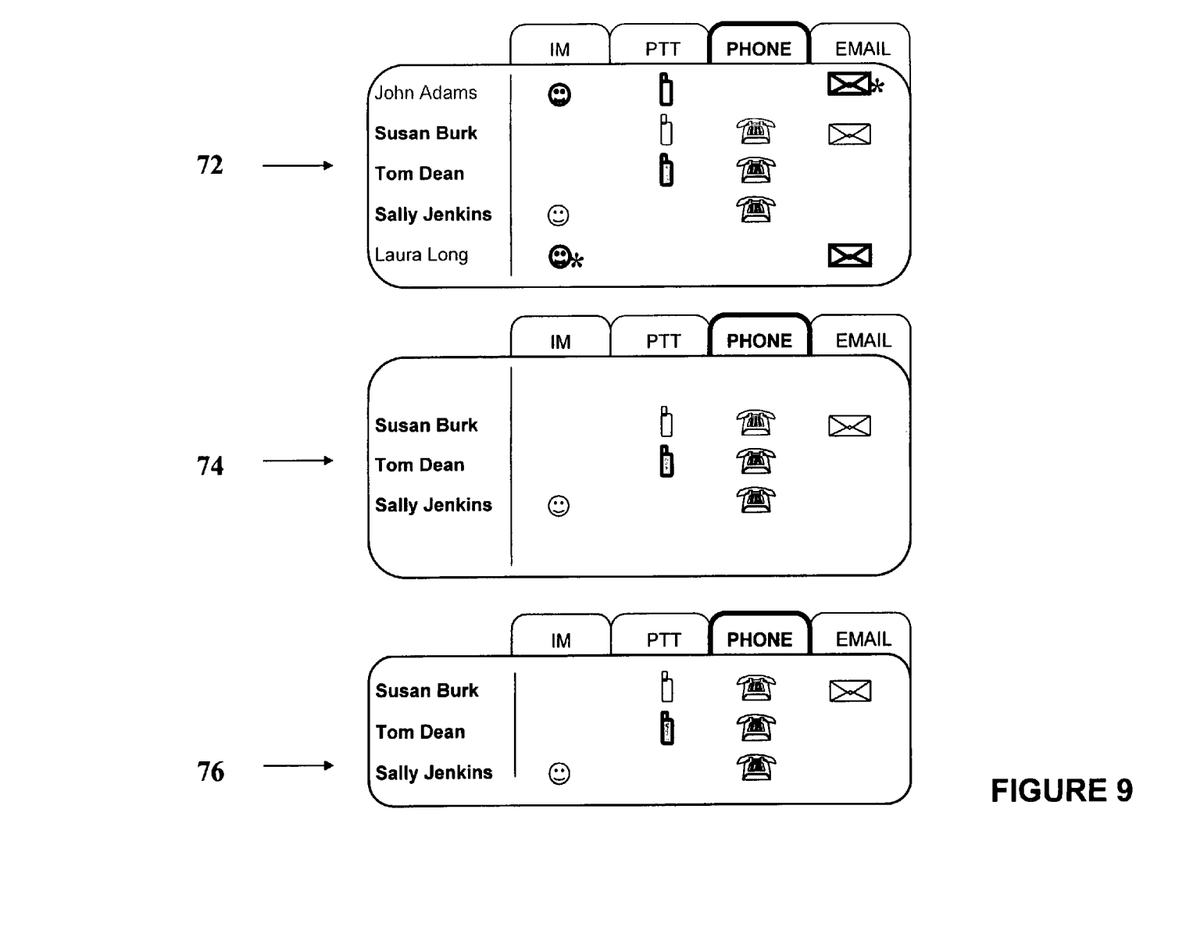
FIG. 9 is an illustration of various exemplary displays for rendering information driven by selection of the Phone communication mode.

FIG. 9 is an illustration of various exemplary displays for rendering information driven by selection of the Phone communication mode. The Phone communication mode is selected as indicated by the Phone tab and text being in bold font in displays 72, 74, and 76. In display 72, the names of members that can not communicate via the selected communication mode, i.e., Phone, are shown in non-bold font. In another embodiment, the names of members not capable of communicating via Phone and their respective icons are not rendered on the display as depicted on display 74. In display 76, the names of members not capable of communication via Phone and their respective icons are not rendered on the display and the display window is compressed.

Figure 10:
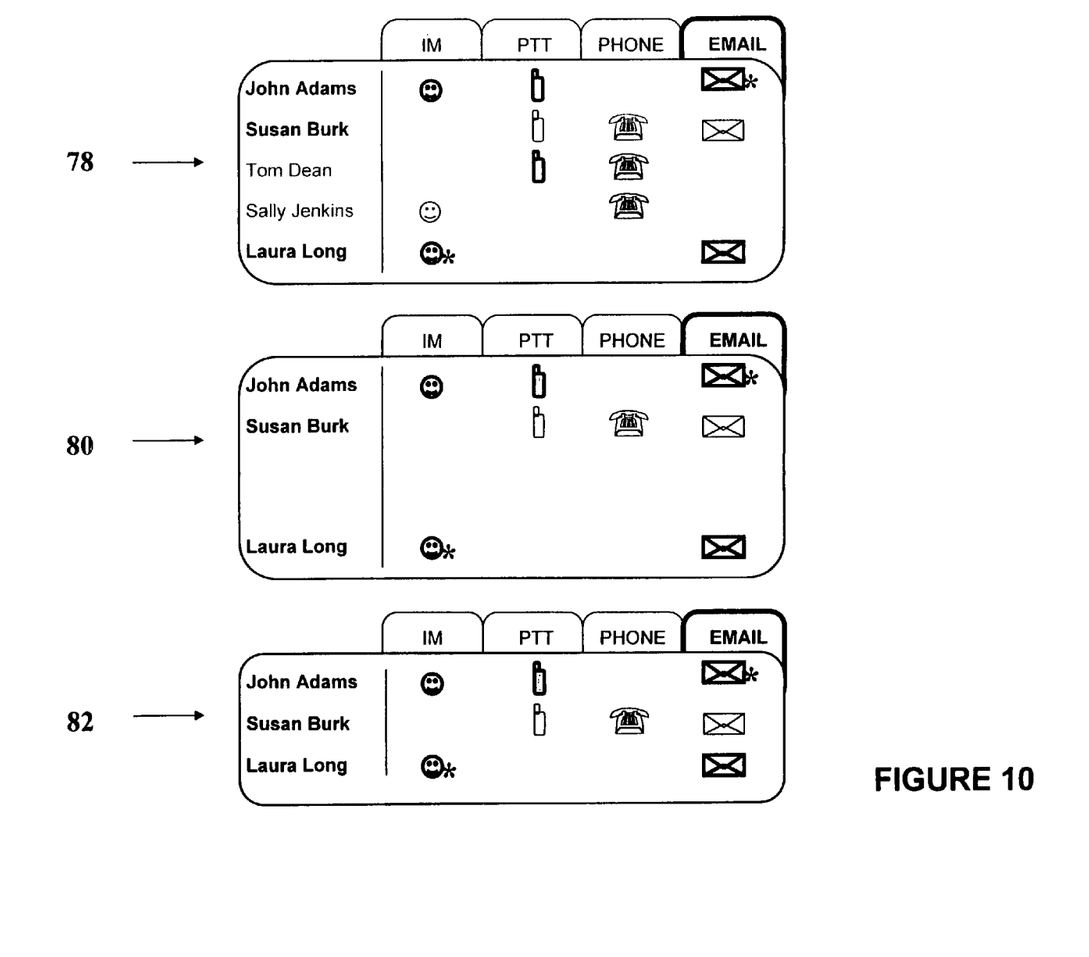
FIG. 10 is an illustration of various exemplary displays for rendering information driven by selection of the Email communication mode.

FIG. 10 is an illustration of various exemplary displays for rendering information driven by selection of the Email communication mode. The Email communication mode is selected as indicated by the Email tab and text being in bold font in displays 78, 80, and 82. In display 78, the names of members that can not communicate via the selected communication mode, i.e., Email, are shown in non-bold font. In another embodiment, the names of members not capable of communicating via Email and their respective icons are not rendered on the display as depicted on display 80. In display 82, the names of members not capable of communication via Email and their respective icons are not rendered on the display and the display window is compressed.

Figure 11:
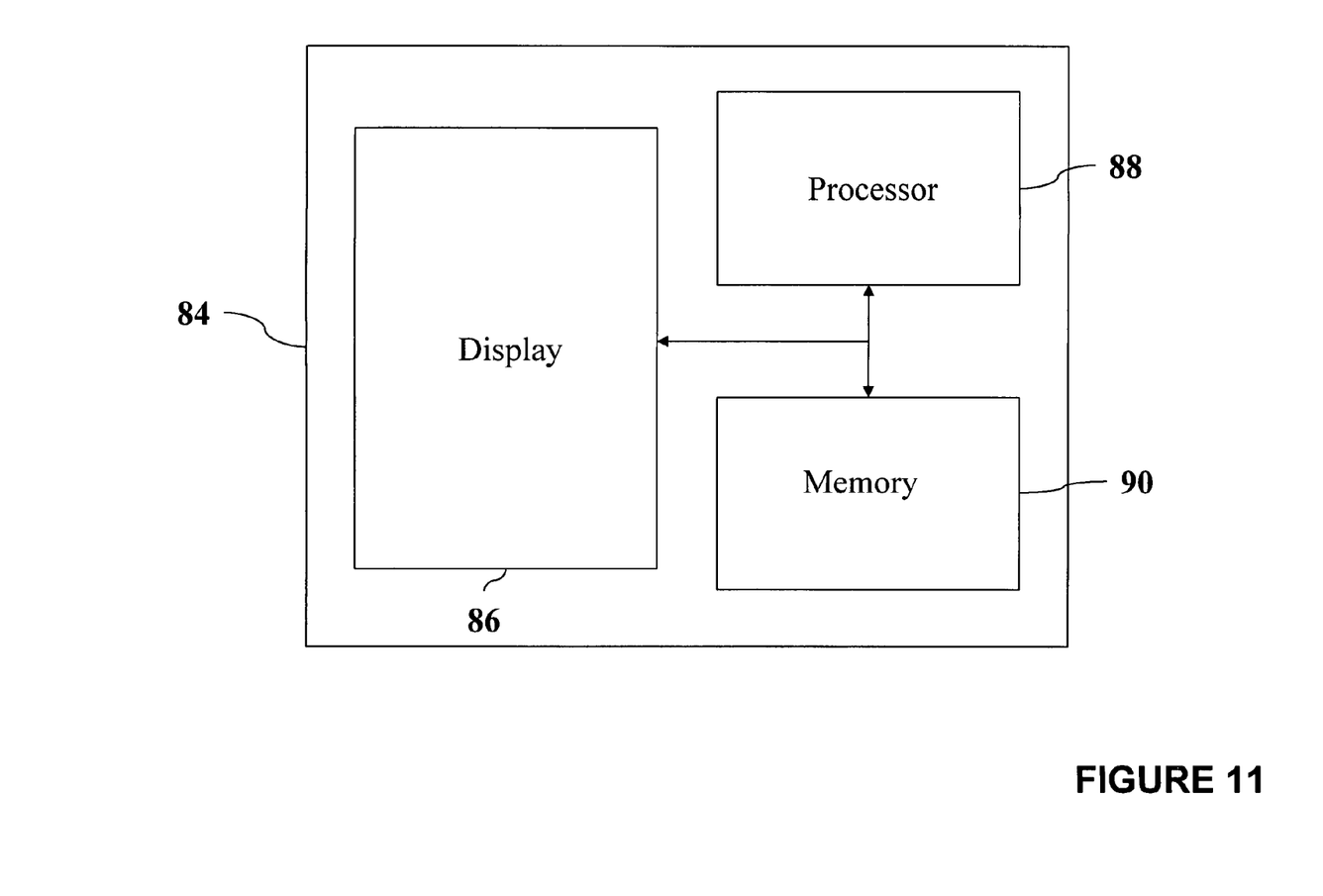
FIG. 11 is a block diagram of an exemplary apparatus for providing communication mode information.

FIG. 11 is a block diagram of an exemplary apparatus 84 for providing communication mode information. The apparatus 84 comprises a processor portion 88, a memory portion 90, and a display portion 84. It is emphasized that the block diagram depicted in FIG. 11 is exemplary and not intended to imply a specific implementation. Thus, the processor 88 can be implemented in a single processor, such as a computer, or multiple processors. Multiple processors can be distributed or centrally located. Multiple processors can communicate wirelessly, via hard wire, or a combination thereof. The apparatus 84 can comprise any appropriate device for providing communication mode information. Examples of appropriate devices include mobile communications devices, mobile telephones, personal digital assistants (PDAs), lap top computers, handheld processors, or a combination thereof.

Communication mode information (e.g., table 12 of FIG. 1) is rendered via the display portion 86. The processor portion 88 processes user inputs and renders the appropriate information via the display portion 86. Contact list information is stored in the memory portion 90. The memory portion 90 stores therein, the names of the members of the contact list and the icons to be rendered. The memory portion 90 also stores therein an indication of attributes associated with each icon, such that the processor portion 88 can assign the correct attributes to respective icons. Changes in preferences and/or member associations with communication modes can be stored in the memory portion 90. The processor portion 88 also initiates communications with members on the contact list.

Figure 12:
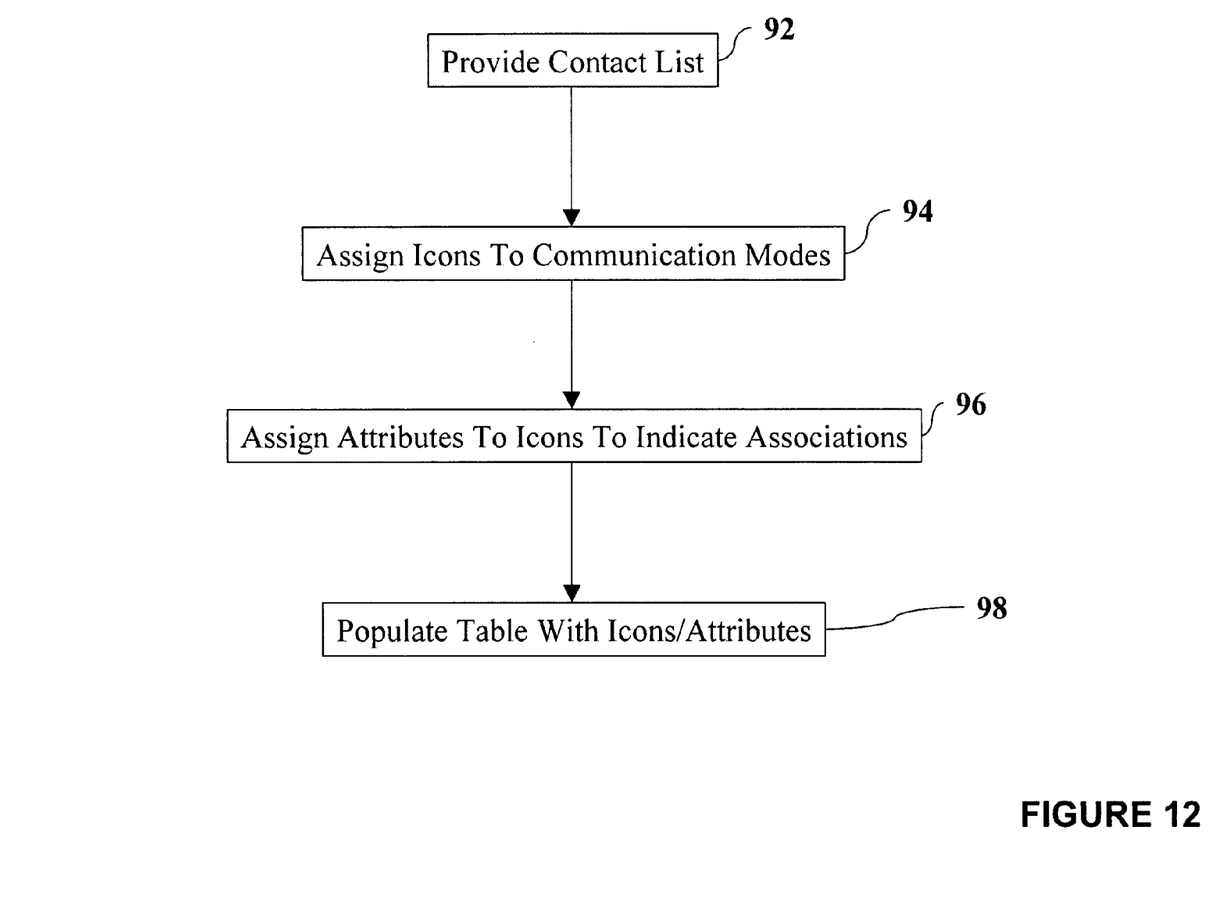
FIG. 12 is a flow diagram of an exemplary process for providing communication mode information.

FIG. 12 is a flow diagram of an exemplary process for providing communication mode information. The contact list is provided at step 92. Step 92 can include rendering at least a portion of the contact list via the display of the mobile communications device. Communication modes are assigned icons at step 94. For example, happy faces could be assigned to the IM communication mode at step 94. Attributes are assigned to each icon at step 96. For example, an icon can be assigned a bold font at step 96. The table is populated with icons at step 98. This includes placing the icons at the appropriate locations on the table. Step 98 also can include rendering the icons via the display of the mobile communications device.

The various techniques described herein can be implemented in connection with hardware or software or, where appropriate, with a combination of both. Thus, the methods and apparatus for resolving an IP address associated with a telephone number, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatuses for providing communication mode information also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of providing communication mode information. Additionally, any storage techniques used in connection with providing communication mode information can invariably be a combination of hardware and software.

Processors for providing communication mode information also can contain communications connections that allow the processor to communicate with other processors and/or devices. Communications connections are an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

While methods, apparatuses, and systems for providing communication mode information have been described in connection with exemplary embodiments of the various figures, it is to be understood that other similar embodiments can be used or modifications and additions can be made to the described embodiments for performing the same function(s) as providing communication mode information without deviating therefrom. Therefore, methods, apparatuses, and systems for providing communication mode information should not be limited to any single embodiment, but rather should be construed in breadth and scope in accordance with the appended claims.

What is claimed:
1. A method comprising:
  determining, for each member of a plurality of members, a subscription status for each communication mode of a plurality of communication modes; wherein the plurality of communication modes comprises at least two of: instant messaging, push to talk, voice communications, or email;
  for each member, determining, for each communication mode to which the member subscribes, an availability status of the member;
  visually rendering, a contact list that displays, in a same frame, contact information for at least two members of the plurality of members, the contact information for each member of the at least two members comprising:
    a name; and
    an icon for each communication mode to which the member subscribes, wherein the icon is further indicative of the availability status of the member for the communication mode by at least one of color coding, highlighting, overlaying the icon with a secondary icon, or modulating at least one attribute of the icon; and
  initiating communications with a selected member of the plurality of members via a selected communication mode by selecting an icon associated with the selected member and the selected communication mode.

2. The method of claim 1, wherein for each member of the at least two members having at least two communication modes, at least one of the icons is further indicative of the member's preferred communication mode.

3. The method of claim 1, wherein the contact list further displays, in response to scrolling, contact information for a third member of the plurality of members via a scrolling display window.

4. The method of claim 1, wherein the communication mode is provided via a mobile communications device.

5. The method of claim 1, wherein the communication mode is provided in accordance with a selected communication mode.

6. An apparatus comprising:
 a processor; and
 memory coupled to the processor, the memory comprising executable instructions that when executed by the processor cause the processor to effectuate operations comprising:
  determining, for each member of a plurality of members, a subscription status for each communication mode of a plurality of communication modes; wherein the plurality of communication modes comprises at least two of: instant messaging, push to talk, voice communications, or email;
  for each member, determining, for each communication mode to which the member subscribes, an availability status of the member;
  visually rendering, via a display portion of the apparatus, a contact list that displays, in a same frame, contact information for at least two members of the plurality of members, wherein the contact information for each member of the at least two members comprises:
   a name; and
   an icon for each communication mode to which the member subscribes, wherein the icon is further indicative of the availability status of the member for the communication mode by at least one of color coding, highlighting, overlaying the icon with a secondary icon, or modulating at least one attribute of the icon; and
  initiating communications with a selected member of the plurality of members via a selected communication mode by selecting an icon associated with the selected member and the selected communication mode.

7. The apparatus of claim 6, wherein, for each member of the at least two members having at least two communication modes, at least one of the icons is further indicative of the member's preferred communication mode.

8. The apparatus of claim 6, wherein the contact list further displays, in response to scrolling, contact information for a third member of the plurality of members via a scrolling display window.

9. The apparatus of claim 6, wherein said processor portion renders via said display portion, communication mode information in accordance with a selected communication mode.

10. A computer-readable memory having stored thereon computer-executable instructions that when executed by a processor cause the processor to effectuate operations comprising:
 determining, for each member of a plurality of members, a subscription status for each communication mode of a plurality of communication modes; wherein the plurality of communication modes comprises at least two of: instant messaging, push to talk, voice communications, or email;
 for each member, determining, for each communication mode to which the member subscribes, an availability status of the member; and
 visually rendering, a contact list that displays, in a same frame, contact information for at least two members of the plurality of members, wherein the contact information for each member of the at least two members comprises:
  a name; and
  an icon for each communication mode to which the subscriber subscribes, wherein the icon is further indicative of the availability status of the member for the communication mode by at least one of color coding, highlighting, overlaying the icon with a secondary icon, or modulating at least one attribute of the icon; and
 initiating communications with a selected member of the plurality of members via a selected communication mode by selecting an icon associated with the selected member and the selected communication mode.

11. The computer-readable memory of claim 10, wherein for each member of the at least two members having at least two communication modes, at least one of the icons is further indicative of the member's preferred communication mode.

12. The computer-readable memory of claim 10, wherein the contact list further displays, in response to scrolling, contact information for a third member of the plurality of members via a scrolling display window.

* * * * *